US012407793B2

(12) United States Patent
Tamagawa

(10) Patent No.: US 12,407,793 B2
(45) Date of Patent: Sep. 2, 2025

(54) DISPLAY CONTROL DEVICE AND DISPLAY CONTROL SYSTEM

(71) Applicant: TOYOTA JIDOSHA KABUSHIKI KAISHA, Toyota (JP)

(72) Inventor: Shuichi Tamagawa, Kitanagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 49 days.

(21) Appl. No.: 18/519,606

(22) Filed: Nov. 27, 2023

(65) Prior Publication Data
US 2024/0251059 A1   Jul. 25, 2024

(30) Foreign Application Priority Data
Jan. 25, 2023   (JP) .................. 2023-009490

(51) Int. Cl.
*H04N 7/18*   (2006.01)
*G06T 3/60*   (2024.01)
*H04N 23/90*   (2023.01)

(52) U.S. Cl.
CPC .............. *H04N 7/181* (2013.01); *G06T 3/60* (2013.01); *H04N 23/90* (2023.01)

(58) Field of Classification Search
CPC .. G05D 1/0033; G05D 1/0246; G08G 1/0116; H04N 23/90; H04N 7/181; G06T 3/60
See application file for complete search history.

(56) References Cited

U.S. PATENT DOCUMENTS

| 7,777,616 | B2 * | 8/2010 | Mase ..................... G08G 1/164 |
| | | | 382/104 |
| 8,406,977 | B2 * | 3/2013 | Tamaoki ......... B60W 30/18154 |
| | | | 701/96 |
| 11,544,918 | B2 * | 1/2023 | Kuybeda .............. G06V 10/143 |
| 2007/0219709 | A1 * | 9/2007 | Ikeda ..................... G02B 27/01 |
| | | | 701/516 |
| 2020/0310409 | A1 | 10/2020 | Otaka |
| 2022/0207279 | A1 * | 6/2022 | Kuybeda .............. H04N 25/671 |

FOREIGN PATENT DOCUMENTS

| JP | H09180087 A | 7/1997 |
| JP | 2004021514 A | 1/2004 |
| JP | 2020167550 A | 10/2020 |

* cited by examiner

*Primary Examiner* — Boubacar Abdou Tchoussou
(74) *Attorney, Agent, or Firm* — Dinsmore & Shohl LLP

(57) ABSTRACT

A display control device is configured to control image display of a display device for remote operation of a moving body. The display device includes one or more screens respectively configured to display one or more intersection images captured by one or more cameras. The one or more cameras are installed at an intersection through which the moving body passes and are configured to each image a traffic situation in an area of the intersection. The display control device includes a processor configured to execute an image process of arranging the one or more intersection images on the one or more screens in different modes depending on a relation between one or more imaging directions of the one or more cameras and a traveling direction of the moving body.

4 Claims, 6 Drawing Sheets

Embodiment

Image of First Camera 31A
Image of Second Camera 31B

FIG. 4B  Comparative Example

Image of First Camera 31A     Image of Second Camera 31B

FIG. 4C  Embodiment

Image of Second Camera 31B     Image of First Camera 31A

DISPLAY CONTROL DEVICE AND DISPLAY CONTROL SYSTEM

CROSS-REFERENCES TO RELATED APPLICATION

The present disclosure claims priority under 35 U.S.C. § 119 to Japanese Patent Application No. 2023-009490, filed on Jan. 25, 2023, which is incorporated herein by reference in its entirety.

TECHNICAL FIELD

The present disclosure relates to a display control device and a display control system for remote operation of a moving body.

BACKGROUND

JP 2020-167550 A discloses a communication device configured to acquire information used for remote operation of a moving body. The communication device obtains information from a road management camera based on the geographic location of the moving body. The road management camera is installed at a traffic signal or beside a road and captures an image of the road.

JP H09-180087 A discloses a traffic information providing system configured to capture an image of a road condition and display the captured image on an in-vehicle display device. Further, JP 2004-021514 A discloses a traffic information display system including an information display device mounted on a vehicle. This information display device obtains the course direction of the subject vehicle in the received captured image from map information of a selected point and a received camera parameter, and combines the information indicating the course direction with the captured image to display the combined image on a screen.

SUMMARY

In order to confirm safety of a remote operator during remote operation (remote driving, remote assistance, or remote monitoring) of a moving body, such as an automobile, it is conceivable to display, on a screen of a display device of a remote operator terminal, an image of a camera installed at an intersection. In order to display this kind of image, it is required that the remote operator who views the image displayed on the display device can easily grasp the traffic situation while instantaneously grasping the traveling direction of the moving body in the image.

However, the technique described in JP 2020-167550 A relates to acquisition of an image from the road management camera, and does not disclose how the acquired image of the intersection should be displayed on the display device of the remote operator terminal from the viewpoint of improving the visibility of the remote operator. This also applies to the techniques described in JP H09-180087 A and JP 2004-021514 A.

The present disclosure has been made in view of the problem described above, and an object thereof is to provide a display control device and a display control system that can improve the visibility of a remote operator with respect to image display of a display device for remote operation of a moving body.

A display control device according to the present disclosure is configured to control image display of a display device for remote operation of a moving body. The display device includes one or more screens respectively configured to display one or more intersection images captured by one or more cameras. The one or more cameras are installed at an intersection through which the moving body passes and are configured to each image a traffic situation in an area of the intersection. The display control device includes a processor configured to execute an image process of arranging the one or more intersection images on the one or more screens in different modes depending on a relation between one or more imaging directions of the one or more cameras and a traveling direction of the moving body.

According to the present disclosure, the visibility of the remote operator with respect to the image display of the display device for the remote operation of the moving body can be improved.

BRIEF DESCRIPTION OF DRAWINGS

FIG. 4B is a diagram used to describe the image process IP applied to the intersection P1;

FIG. 4C is a diagram used to describe the image process IP applied to the intersection P1;

DETAILED DESCRIPTION

Figure 1:
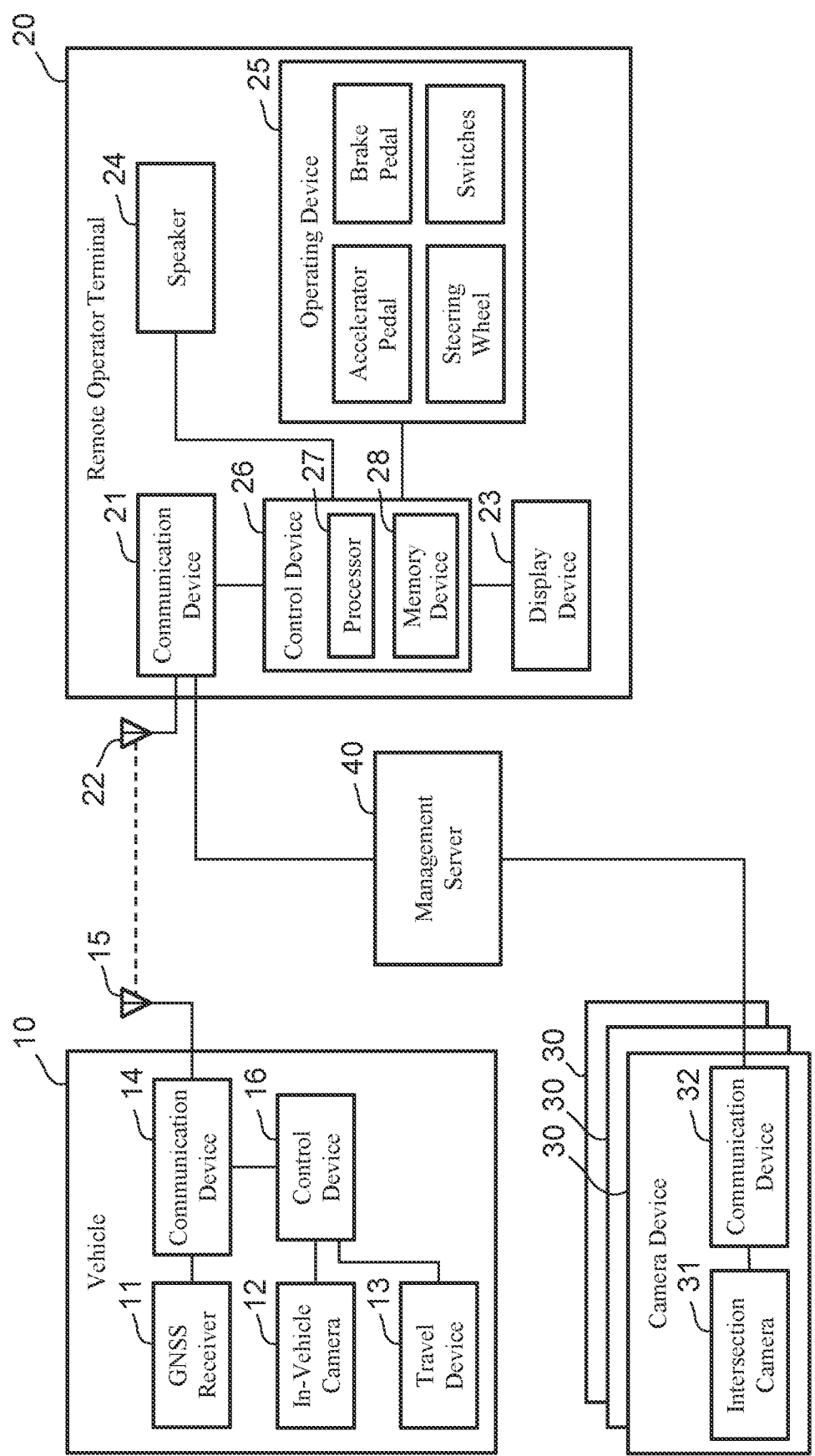
FIG. 1 is a diagram schematically illustrating a configuration example of a remote operation system to which a display control device according to an embodiment is applied.

Hereinafter, embodiments of the present disclosure will be described with reference to the accompanying drawings. In addition, common elements in the drawings are denoted by the same reference numerals, and redundant description thereof will be omitted or simplified.

1. Configuration of Remote Operation System

FIG. 1 is a diagram schematically illustrating a configuration example of a remote operation system 1 to which a display control device according to an embodiment is applied. The remote operation system 1 includes a vehicle 10, a remote operator terminal 20, a camera device 30, and a management server 40.

1-1. Vehicle

The vehicle 10 is an example of a "moving body" that is a target of "remote operation" according to the present disclosure, and more specifically, is, for example, an automobile. The vehicle 10 includes a global navigation satellite system (GNSS) receiver 11, a plurality of in-vehicle cameras 12, a travel device 13, a communication device 14, an antenna 15, and a control device 16.

The GNSS receiver 11 is used to acquire a position and an orientation of the vehicle 10. The plurality of in-vehicle cameras 12 recognize (detect) a situation around the vehicle 10. The plurality of in-vehicle cameras 12 include, for example, cameras that respectively image the front center, the left front, and the right front of the vehicle 10.

The travel device 13 includes a drive device, a brake device, and a steering device. The drive device includes, for example, at least one of an electric motor and an internal combustion engine for driving the vehicle 10. The brake device includes a brake actuator for braking the vehicle 10. The steering device includes, for example, an electric motor configured to steer wheels.

The communication device 14 communicates with the outside of the vehicle 10. Specifically, the communication device 14 communicates with, for example, the remote operator terminal 20 via the antenna 15.

The control device 16 is a computer configured to control the vehicle 10. The control device 16 includes one or more processors and one or more memory devices. The one or more processors execute various processes related to control of the vehicle 10. The one or more memory devices store various types of information necessary for the processes executed by the one or more processors.

During the remote operation of the vehicle 10, the control device 16 communicates with the remote operator terminal 20 via the communication device 14. The control device 16 transmits vehicle information VCL to the remote operator terminal 20. The vehicle information VCL is information necessary for the remote operation by the remote operator, and includes surrounding situation information of the vehicle 10. The surrounding situation information includes images captured by the in-vehicle cameras 12. The surrounding situation information may include sound detected by an in-vehicle microphone. The surrounding situation information may include object information related to a moving object around the vehicle 10. The object information indicates a relative position and a relative speed of an object with respect to the vehicle 10. Moreover, the vehicle information VCL may include vehicle state information, such as a speed, an acceleration, a yaw rate, and a steering angle of the vehicle 10, and vehicle position information.

Further, the control device 16 receives remote operation information from the remote operator terminal 20. The remote operation information is related to the remote operation by the remote operator. For example, the remote operation information includes the amount of operation by the remote operator. The control device 16 performs vehicle traveling control by controlling the travel device 13 in accordance with the received remote operation information.

1-2. Remote Operator Terminal

The remote operator terminal 20 is a terminal device used when the remote operator remotely operates the vehicle 10. The "remote operation" according to the present disclosure is a concept including "remote driving" in which a remote operator drives a moving body from a remote place, "remote assistance" in which a remote operator assists the driving of a moving body from a remote place, and "remote monitoring" in which a remote operator monitors the driving of a moving body from a remote place. In addition, when the remote operation is performed as the remote driving, the remote operator terminal 20 corresponds to a remote cockpit.

The remote operator terminal 20 includes a communication device 21, an antenna 22, a display device 23, a speaker 24, an operating device 25, and a control device 26.

The communication device 21 performs communication (wireless communication) with the vehicle 10 via the antenna 22. Further, the communication device 21 communicates with the management server 40.

The display device 23 presents various kinds of information to the remote operator by displaying the various kinds of information. The various kinds of information include images of intersection areas (intersection images) captured by a plurality of intersection cameras 31. That is, each of the intersection images is an image indicating the traffic situation in an area of the intersection into which the vehicle 10 enters.

Figure 2:
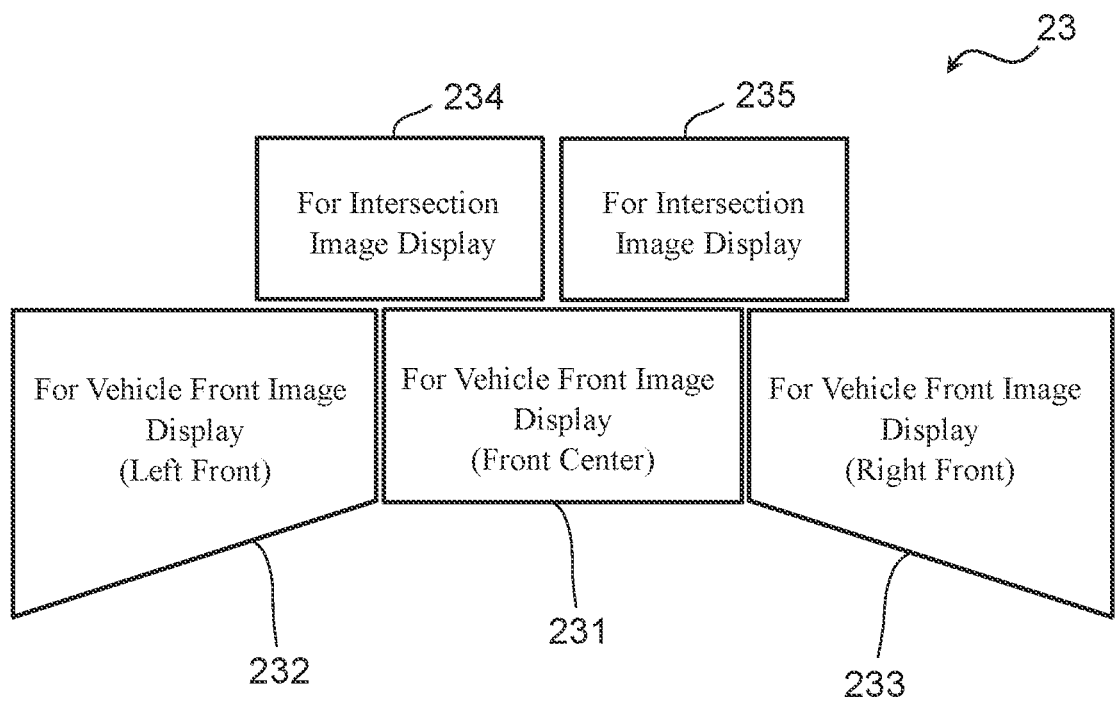
FIG. 2 is a diagram showing an example of a screen configuration of a display device shown in FIG. 1.

FIG. 2 is a diagram showing an example of a screen configuration of the display device 23 shown in FIG. 1, and shows the display device 23 viewed from the remote operator. That is, the right side of the drawing sheet corresponds to the right side of the screen when viewed from the remote operator, and the left side of the drawing sheet corresponds to the left side of the screen when viewed from the remote operator.

In the example illustrated in FIG. 2, the display device 23 includes five monitors 231, 232, 233, 234, and 235. The monitors 231, 232, and 233 display images in front of the vehicle 10 (vehicle front images) captured by the plurality of in-vehicle cameras 12. More specifically, as an example, one or more vehicle front images include a front center image displayed by the monitor 231, a left front image displayed by the monitor 232, and a right front image displayed by the monitor 233. As shown in FIG. 2, the monitor 232 is arranged on the left side of the monitor 231, and the monitor 233 is arranged on the right side of the monitor 231.

The monitors 234 and 235 each display an intersection image. As shown in FIG. 2, the monitors 234 and 235 are arranged side by side in the left-right direction, and are arranged above the monitors 231 to 233, for example. Specific examples of images displayed on the monitors 234 and 235 will be described below with reference to FIGS. 3A, 3B, 4A, 4B, 4C, 5A, and 5B. In addition, in the example illustrated in FIG. 2, the display device 23 includes one monitor (each of the monitors 231 to 235) for one image. Instead of this example, the "display device" according to the present disclosure may include one monitor configured display both the vehicle front image and the intersection image.

The speaker 24 presents sound information to the remote operator by outputting the sound information. The sound information includes the sound detected by the in-vehicle microphone described above.

The operating device 25 receives an input from the remote operator. For example, the operating device 25 includes one or more remote operation members operated by the remote operator when remotely operating the vehicle 10. The one or more remote operation members include an accelerator pedal, a brake pedal, and a steering wheel. In addition, the operating device 25 includes switches for other various operations related to the remote operation.

The control device 26 controls the remote operator terminal 20. The control device 26 includes one or more processors 27 (hereinafter, simply referred to as "processor 27") and one or more memory devices 28 (hereinafter, simply referred to as "memory device 28"). The processor 27 executes various processes. For example, the processor 27 includes a central processing unit (CPU). The memory device 28 stores various types of information necessary for the processes executed by the processor 27. The memory device 28 is, for example, at least one of a volatile memory, a nonvolatile memory, a hard disk drive (HDD), and a solid state drive (SSD).

Remote operation program is a computer program executed by the processor 27. The function of the control device 26 is realized by the processor 27 executing the remote operation program. The remote operation program is stored in the memory device 28. Alternatively, the remote operation program may be recorded in a computer-readable recording medium. The remote operation program may be provided via a network.

The control device 26 communicates with the vehicle 10 via the communication device 21. The control device 26 receives the vehicle information VCL transmitted from the vehicle 10. The control device 26 presents the vehicle information VCL to the remote operator via the display device 23 and the speaker 24. For example, the control device 26 displays the images captured by the in-vehicle camera 12 on the display device 23. Further, the control device 26 outputs the sound detected by the in-vehicle microphone from the speaker 24. The remote operator can recognize the state of the vehicle 10 and the surrounding situation based on the vehicle information VCL.

The remote operator operates the remote operation members of the operating device 25. The operating amounts of the remote operation members are detected by sensors provided in the remote operation members. The control device 26 generates the remote operation information reflecting the operating amounts of the remote operation members by the remote operator. Then, the control device 26 transmits the remote operation information to the vehicle 10 via the communication device 21.

1-3. Intersection Camera

The plurality of intersection cameras 31 (hereinafter, also simply referred to as "camera 31") are installed at each intersection through which the vehicle 10 passes, and capture an image of an intersection area (more specifically, the inside of the intersection and the vicinity thereof). Each of the plurality of cameras 31 is configured as, for example, the camera device 30 including the camera 31 and a communication device 32. More specifically, for example, one or more cameras 31 are installed at one intersection. In the example shown in FIG. 3 described below, two cameras 31 are installed for one intersection.

An image of an intersection area (intersection image) captured by each camera 31 is transmitted to the management server 40 via the communication device 32. The management server 40 is configured to be able to communicate with each camera device 30, and manages the intersection image transmitted from each camera device 30. The management server 40 is also configured to be able to communicate with the remote operator terminal 20. When the vehicle 10 approaches an intersection area, the control device 26 of the remote operator terminal 20 requests the management server 40 to transmit an image of the intersection area. In response to the request, the management server 40 transmits the image of the corresponding intersection area to the remote operator terminal 20.

Additionally, communication between the management server 40 and each camera device 30 may be either wired communication or wireless communication. This also applies to communication between the management server 40 and the remote operator terminal 20. Furthermore, unlike the example illustrated in FIG. 1, the acquisition of the intersection image by the remote operator terminal 20 may be performed by direct communication with each camera device 30 without going through the management server 40.

2. Control of Image Display on Display Device

In the remote operation system 1 described above, the control device 26 of the remote operator terminal 20 controls the image display of the display device 23 for the remote operation of the vehicle 10 (moving body). Therefore, the control device 26 corresponds to an example of the "display control device" according to the present disclosure, and a system that includes the control device 26 and the intersection camera 31 corresponds to an example of the "display control system" according to the present disclosure.

When the image of the intersection camera 31 is displayed on the display device 23 for the safety confirmation by the remote operator, it is required for the display of the image requires that the remote operator viewing the image displayed on the display device 23 can easily grasp the traffic situation while instantaneously grasping a traveling direction Dv of the vehicle 10 in the image.

More specifically, as illustrated in FIG. 2, on the screen of the display device 23 installed in the remote operator terminal 20, the image from the in-vehicle camera 12 (vehicle front image) and the image from the intersection camera 31 (intersection image) are simultaneously displayed and mixed. The remote operator is required to view all of these multiple images. Also, the remote operator recognizes the space in the image and converts the space in his or her brain as necessary for the space recognition every time he or she puts his or her line of sight on each image. Moreover, the orientation of the intersection camera 31 (imaging direction Dc) and the installation location thereof vary depending on the environment of each intersection. Therefore, the intersection image of each intersection is affected by the differences in the orientation and the installation location of the intersection camera 31. Therefore, it is difficult to instantaneously determine the positional relation between a moving object, such as another vehicle or a pedestrian, in an intersection area and the vehicle 10 and instantaneously determine the moving direction of the moving object (for example, whether or not the moving object is approaching the vehicle 10) while instantaneously grasping the traveling direction Dv of the vehicle 10 in the intersection image.

In view of the above issue, in the present embodiment, the control device 26 (processor 27) executes the following "image process IP". According to the image process IP, the intersection image is arranged on the screen of the display device 23 in different modes depending on the relation between the imaging direction Dc of the camera 31 and the traveling direction Dv of the vehicle 10 (moving body).

Figure 3A:
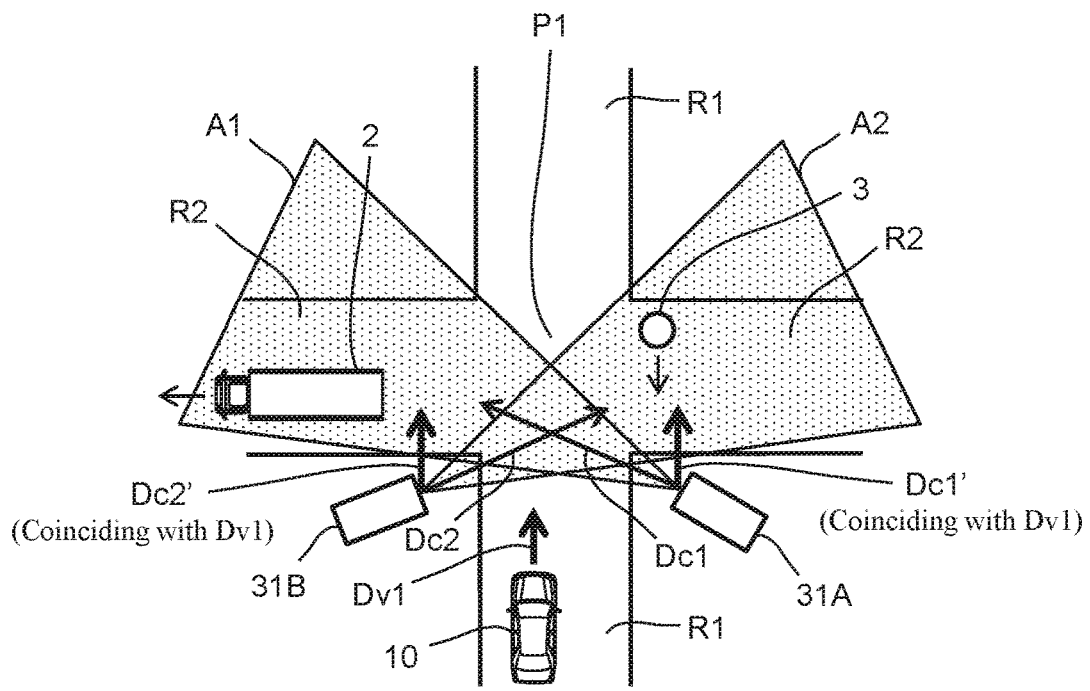
FIG. 3A is a diagram used to describe an image process IP applied to an intersection P1 in which two intersection cameras are installed.

A specific example of the image process IP will be described with reference to FIGS. 3A, 3B, 4A, 4B, and 4C. As shown in FIGS. 3A and 4A, this specific example will be described by taking, as an example, an intersection P1 where two intersection cameras 31A and 31B (a first camera 31A and a second camera 31B) are installed.

The area of the intersection P1 imaged by the cameras 31A and 31B includes not only an area located in the intersection P1 but also a first road R1 on which the vehicle 10 travels and a second road R2 that intersects with the first road R1 at the intersection P1.

More specifically, FIG. 3A illustrates a traffic situation in the area of the intersection P1 when the vehicle 10 traveling on the first road R1 along a traveling direction Dv1 is approaching the intersection P1. In this situation, the first camera 31A is located beside the first road R1 on the right side of the vehicle 10 when viewed from the vehicle 10. Also, the first camera 31A captures not only the area in the intersection P1 but also an area of the second road R2 located on the left side of the intersection P1. Another vehicle 2 traveling on the second road R2 is included in an imaging area A1 of this first camera 31A. In addition, instead of the described above, the installation location of the first camera 31A that captures the area of the second road R2 on the left side of the intersection P1 illustrated in FIG. 3A may be, for example, inside the intersection P1 or beside the road on the left side of the vehicle 10.

Moreover, in the above-described situation shown in FIG. 3A, the second camera 31B is located beside the first road R1 on the left side of the vehicle 10 when viewed from the vehicle 10. Also, the second camera 31B captures not only the area in the intersection P1 but also an area of the second road R2 located on the right side of the intersection P1. A pedestrian 3 crossing the second road R2 is included in an imaging area A2 of this second camera 31B. In addition, instead of the example described above, the installation location of the second camera 31B that captures the area of the second road R2 on the right side of the intersection P1 illustrated in FIG. 3A may be, for example, inside the intersection P1 or beside the road on the right side of the vehicle 10.

Figure 3B:
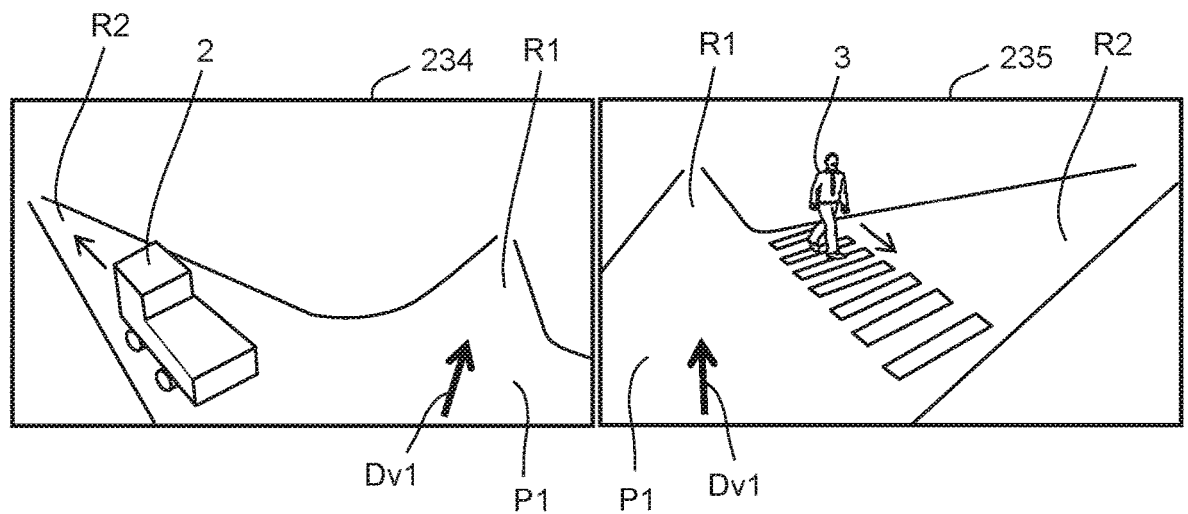
FIG. 3B is a diagram used to describe the image process IP applied to the intersection P1 in which two intersection cameras are installed.
Figure 4A:
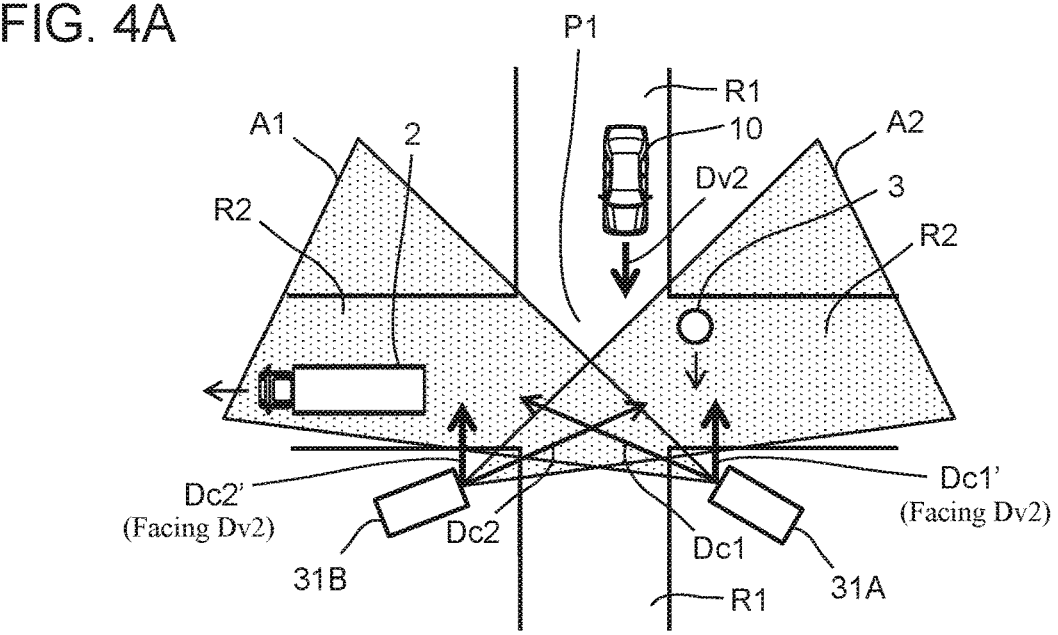
FIG. 4A is a diagram used to describe the image process IP applied to the intersection P1.
Figure 4A:
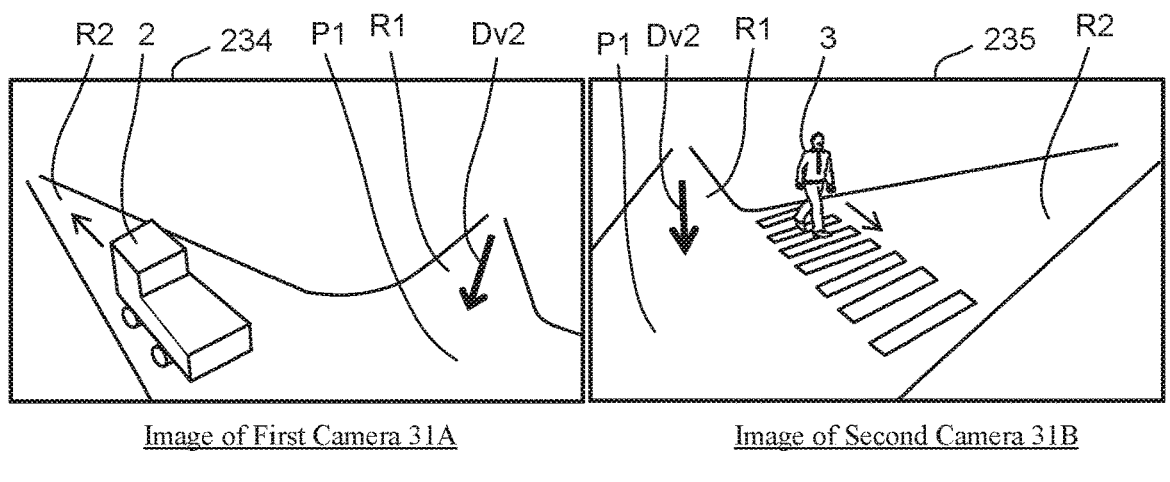
Figure 4A:
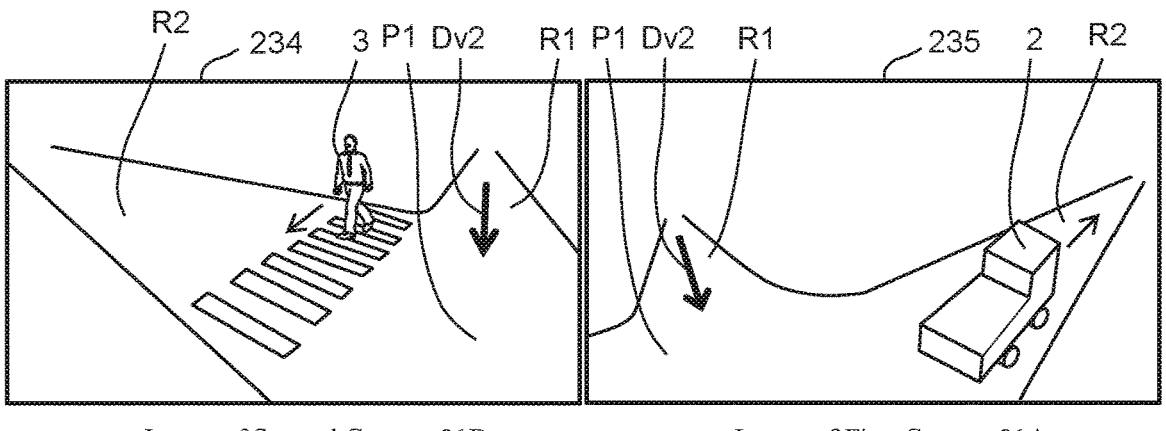

FIG. 3B shows an image display pattern PT1 obtained by the image process IP according to the embodiment. The image display pattern PT1 corresponds to the display of the intersection image on the display device 23 in the above-described situation shown in FIG. 3A. The two intersection images shown in FIG. 3B correspond to the images themselves displayed on the screen of the display device 23 as it is in a state of being captured by the first and second cameras 31A and 31B, respectively. In addition, various arrows shown in the intersection images in FIG. 3B are shown for reference of description, and are not included in the intersection images. The same applies to FIGS. 4B, 4C, 5A, and 5B described below.

In the situation shown in FIG. 3A, directions Dc1' and Dc2' of vehicle-traveling-direction components of vectors that indicate respective imaging directions Dc1 and Dc2 of the first and second cameras 31A and 31B coincide with a traveling direction Dv1. In this situation, the control device 26 (processor 27) selects the image display pattern PT1 in the image process IP.

In the image display pattern PT1, as shown in FIG. 3B, the image of the first camera 31A (i.e., the intersection camera capturing the area of the second road R2 located on the "left side" of the intersection P1 when viewed from the vehicle 10) is arranged on the "left side" in the screen of the display device 23. More specifically, the image of the first camera 31A is displayed on the screen of the left-side monitor 234. On the other hand, the image of the second camera 31B (i.e., the intersection camera capturing the area of the second road R2 located on the "right side" of the intersection P1 when viewed from the vehicle 10) is arranged on the "right side" in the screen of the display device 23. More specifically, the image of the second camera 31B is displayed on the screen of the right-side monitor 235. As described above, according to the image display pattern PT1, the image of the first camera 31A is arranged on the left side of the image of the second camera 31B.

According to the image display pattern PT1, another vehicle 2 that is present on the left side (more specifically, the left front side) of the vehicle 10 at the actual intersection P1 and is traveling in a direction away from the vehicle 10 can be displayed on the screen of the monitor 234 on the left side when viewed from the remote operator so as to be seen in the same manner as the actual appearance. Therefore, the intersection image of the first camera 31A can be displayed so as to have the same appearance as those of the vehicle front images displayed on the monitors 231 and 232.

Moreover, according to the image display pattern PT1, the pedestrian 3 who is present on the right side (more specifically, the right front side) of the vehicle 10 at the actual intersection P1 and is crossing the second road R2 in a direction approaching the vehicle 10 can be displayed on the screen of the monitor 235 on the right side when viewed from the remote operator so as to be seen in the same manner as the actual appearance. Therefore, the intersection image of the second camera 31B can be displayed so as to have the same appearance as those of the vehicle front images displayed on the monitors 231 and 233.

FIG. 4B is a diagram used to describe an issue that occurs when the image display pattern PT by the image process IP is not changed in accordance with the traveling direction Dv of the vehicle 10.

FIG. 4A shows a traffic situation in the area of the intersection P1 when the vehicle 10 traveling along a traveling direction Dv2 opposite to the traveling direction Dv1 shown in FIG. 3A is approaching the intersection P1. FIG. 4B corresponds to a comparative example in which, in the situation shown in FIG. 4A, the image of the first camera 31A is displayed as it is on the screen of the left-side monitor 234 and the image of the second camera 31B is displayed as it is on the screen of the right-side monitor 235 without special consideration, similarly to the example shown in FIG. 3B. In addition, FIG. 4B shows the intersection images at the same time point as the intersection images shown in FIG. 3B.

According to the image display shown in FIG. 4B, another vehicle 2 that is present in the right front of the vehicle 10 at the actual intersection P1 as shown in FIG. 4A is displayed on the left side when viewed from the remote operator. Also, the pedestrian 3 that is present in the left front of the vehicle 10 at the actual intersection P1 is displayed on the right side when viewed from the remote operator. More specifically, on the left-side monitors 232 and 234 (see FIG. 2) of the display device 23, the intersection image of the area actually located on the right side of the vehicle 10 is arranged together with the left front image of the vehicle 10. Similarly, on the right-side monitors 233 and 235, the intersection image of the area actually located on the left side of the vehicle 10 is arranged together with the right front image of the vehicle 10. This results in confusion for the remote operator.

FIG. 4C shows an image display pattern PT2 obtained by the image process IP according to the embodiment. In view of the issue described with reference to FIG. 4B, according to the image process IP, the image display pattern PT2 is selected in order to display the intersection images on the display device 23 under the above-described situation shown in FIG. 4A. In addition, FIG. 4C shows intersection images at the same time point as the intersection images shown in FIGS. 3B and 4B.

To be specific, in the situation shown in FIG. 4A, the directions Dc1' and Dc2' of the vehicle-traveling-direction components of the vectors that indicate the respective imaging directions Dc1 and Dc2 of the first and second cameras 31A and 31B face the traveling direction Dv2. Therefore, the control device 26 (processor 27) selects the image display pattern PT2 in the image process IP.

In the image display pattern PT2, as shown in FIG. 4C, the image of the first camera 31A (i.e., the intersection camera capturing the area of the second road R2 located on the "right side" of the intersection P1 when viewed from the vehicle 10) is arranged on the "right side" in the screen of the display device 23. More specifically, the image of the first camera 31A is displayed on the screen of the right-side monitor 23S. On the other hand, the image of the second camera 31B (i.e., the intersection camera capturing the area of the second road R2 located on the "left side" of the intersection P1 when viewed from the vehicle 10) is arranged on the "left side" in the screen of the display device 23. More specifically, the image of the second camera 31B is displayed on the screen of the left-side monitor 234.

As described above, according to the image display pattern PT2, the image of the first camera 31A is arranged on the right side of the image of the second camera 31B. As a result, in consideration of the fact that the relation with the imaging direction Dc of the camera 31 is different between the traveling direction Dv1 and the traveling direction Dv2, the arrangement laterally opposite to the arrangement of the two intersection images of the image display pattern PT1 is adopted. Thus, the two intersection images can be arranged so as to be matched with the left and right of the vehicle front images displayed on the display device 23.

However, with only the measures described above, the horizontal direction in each intersection image becomes opposite to the actual horizontal direction. More specifically, the moving direction of the moving object (for example, another vehicle 2 illustrated in FIG. 4A) moving along the second road R2 becomes opposite to the actual moving direction and the moving direction of the vehicle 2 displayed in the vehicle front image (right front image). As a result, in this example of the vehicle 2, the remote operator may erroneously determine that the vehicle 2 is approaching the vehicle 10 even though the vehicle 2 is actually moving away from the vehicle 10.

Therefore, according to the image display pattern PT2, as shown in FIG. 4C, each of the images of the first and second cameras 31A and 31B is flipped horizontally. Accordingly, even when the above-described directions Dc1' and Dc2' related to the first and second cameras 31A and 31B face the traveling direction Dv2, the intersection images can be appropriately displayed such that the confusion of the remote operator is reduced.

Figure 5A:
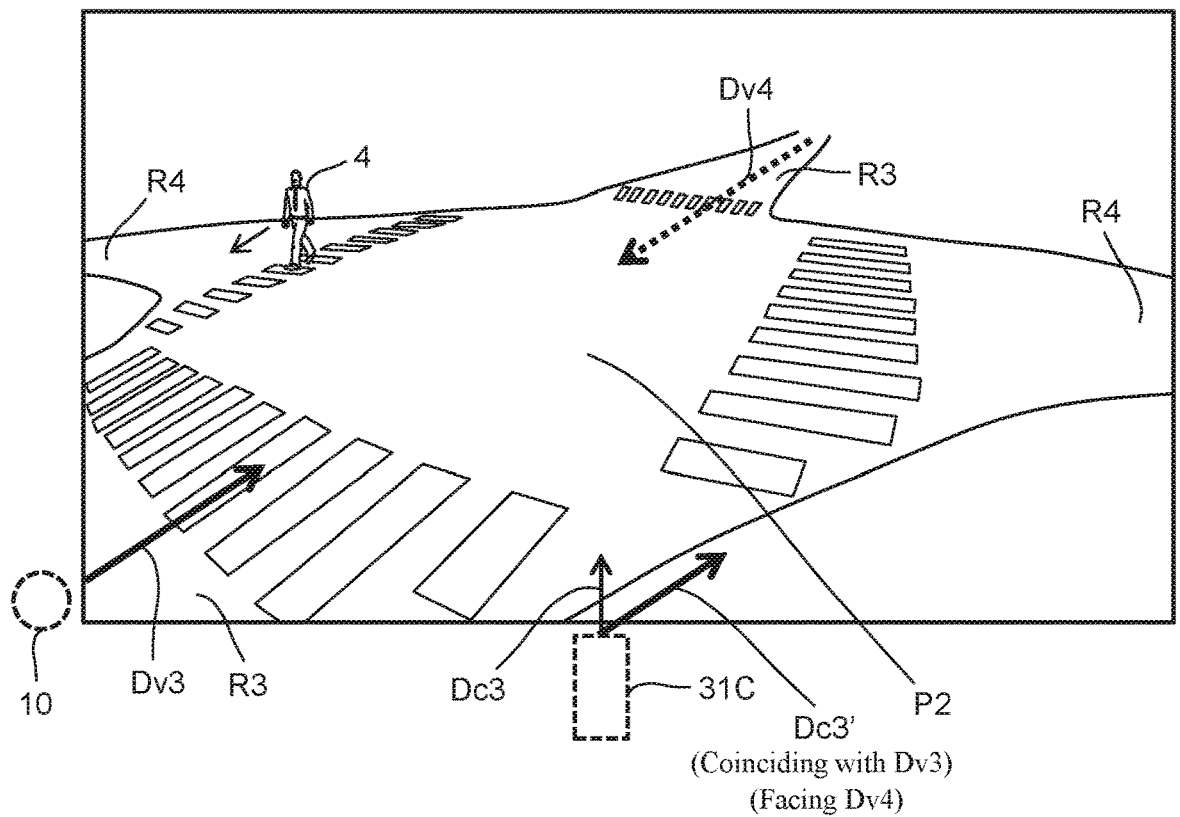
FIG. 5A is a diagram used to describe an image process IP applied to an intersection P2 in which only one intersection camera is installed.
Figure 5B:
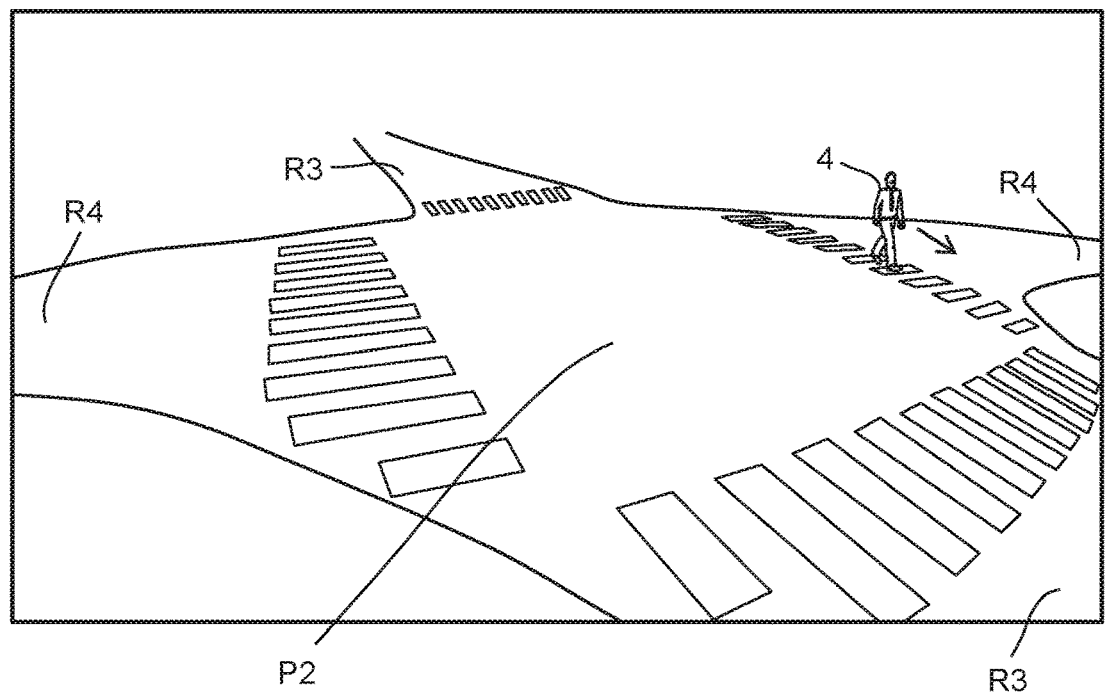
FIG. 5B is a diagram used to describe the image process IP applied to the intersection P2.

Next, FIGS. 5A and 5B are diagrams used to describe an image process IP applied to an intersection P2 in which only one intersection camera 31 (hereinafter, referred to as a camera 31C for convenience) is installed. The intersection image shown in FIG. 5A corresponds to the image itself displayed on the screen of the display device 23 as it is in a state of being captured by the camera 31C. In addition, when two screens for displaying the intersection images are provided as in the example of the display device 23 shown in FIG. 2, the image captured by the camera 31C is displayed on any one of the two screens. Further, the "display device" to which the example shown in FIGS. 5A and 5B is applied may include only one screen for displaying one intersection image.

FIG. 5A also shows a traffic situation in an area of the intersection P2 when the vehicle 10 traveling along a traveling direction Dv3 is approaching the intersection P2. In this situation, the camera 31C is located beside a road on the right side of the vehicle 10 when viewed from the vehicle 10. Also, the camera 31C captures not only the area in the intersection P2 but also areas of a first road R3 and a second road R4 that intersect with each other at the intersection P2. Further, the image (i.e., the imaging area) of this camera 31C includes a pedestrian 4 crossing a crosswalk.

In the situation shown in FIG. 5A, a direction Dc3' of the vehicle-traveling-direction component of a vector that indicates an imaging direction Dc3 of the camera 31C coincides with a traveling direction Dv3. In this situation, according to the image process IP, the image of the camera 31C is displayed on the screen as shown in FIG. 5A as it is without being flipped horizontally.

On the other hand, in a situation where the vehicle 10 traveling along a traveling direction Dv4 (see FIG. 5A) opposite to the traveling direction Dv3 approaches the intersection P2, the direction Dc3' of the vehicle-traveling-direction component of the vector that indicates the imaging direction Dc3 of the camera 31C faces the traveling direction Dv4. In this situation, according to the image process IP, the image acquired from the camera 31C is displayed on the screen as shown in FIG. 5B by being flipped horizontally.

As described above, according to the image process IP applied to the example shown in FIGS. 5A and 5B, even when one camera 31C is installed for one intersection P2, the intersection image is displayed on the screen in different modes depending on the relation between the imaging direction Dc3 of the camera 31C and the traveling direction Dv.

To be more specific, according to the image process IP applied to the example shown in FIGS. 5A and 5B, similarly to the example shown in FIGS. 3B and 4C, the intersection image (see FIG. 5B) displayed on the screen when the vehicle 10 enters the intersection P2 from the traveling direction Dv4 (second direction) opposite to the traveling direction Dv3 is flipped horizontally with respect to the intersection image (see FIG. 5A) displayed on the screen when the vehicle 10 enters the intersection P2 from the traveling direction Dv3 (first direction).

As a result, when the traveling direction Dv is Dv3, the pedestrian 4 displayed on the left side (left front side) of the vehicle 10 in the vehicle front image showing the actual traffic situation can be displayed on the left side similarly in the intersection image as shown in FIG. 5A. Further, when the traveling direction Dv is Dv4, the pedestrian 4 displayed on the right side (right front side) of the vehicle 10 in the vehicle front image showing the actual traffic situation can be displayed on the right side similarly in the intersection image as shown in FIG. 5B. That is, regardless of whether the traveling direction Dv is Dv3 or Dv4, the occurrence of a difference between the vehicle front image (i.e., the actual situation) and the intersection image can be prevented as to on which side of the vehicle 10 a moving object (for example, the pedestrian 4) in the intersection area is located. As described above, according to the image process IP, even in the example in which one camera 31C is installed for one intersection P2, it is possible to appropriately display the intersection image so as to reduce the confusion of the remote operator caused by the difference in the traveling direction Dv with respect to the imaging direction Dc3 of the camera 31C.

Figure 6:
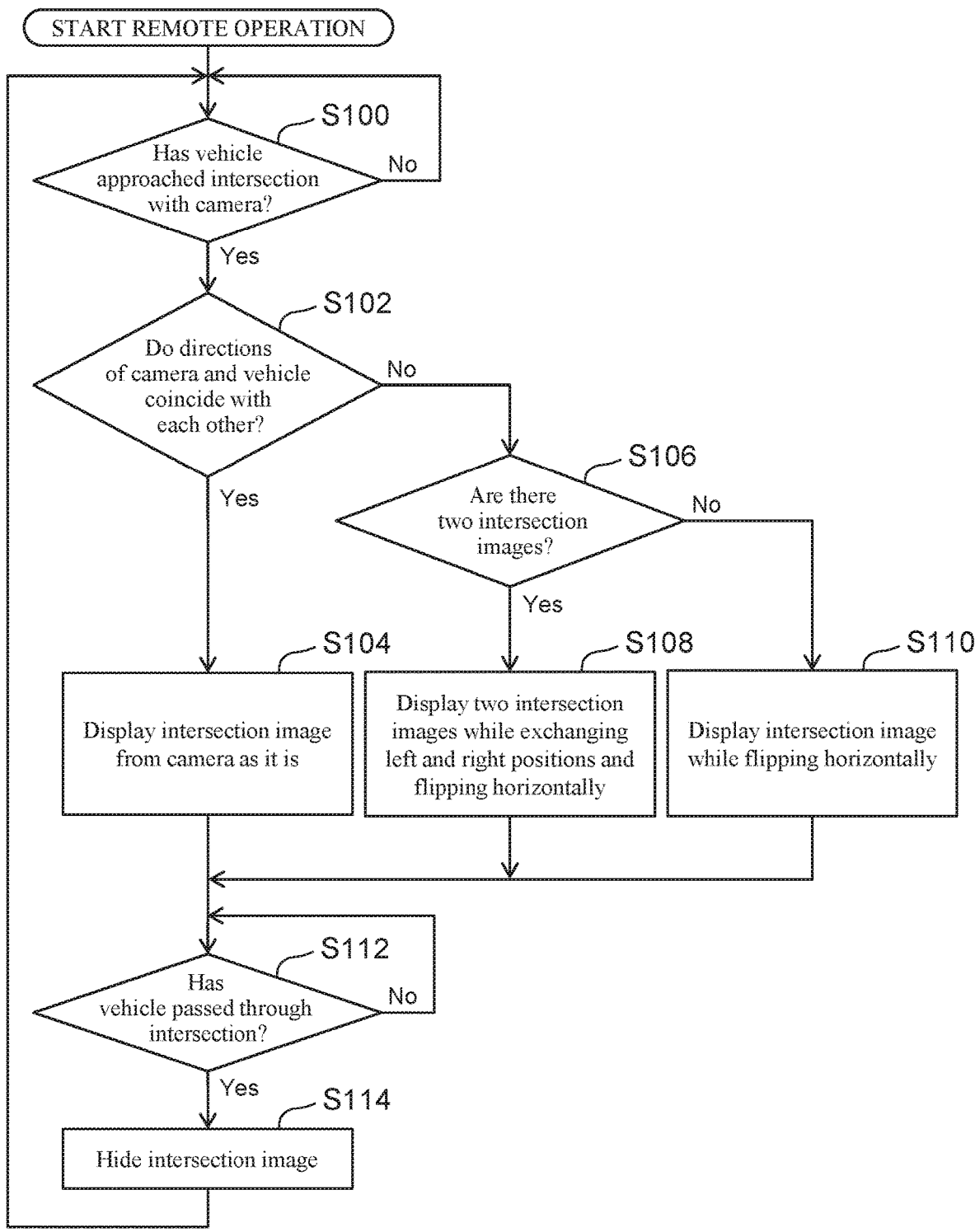
FIG. 6 is a flowchart illustrating an example of a flow of the image process IP according to an embodiment.

FIG. 6 is a flowchart illustrating an example of a flow of the image process IP according to the embodiment. The processing of this flowchart is started when the remote operation of the vehicle 10 is started, and is ended when the remote operation is ended.

In step S100, the control device 26 (processor 27) determines whether or not the vehicle 10 has approached an intersection where the intersection camera 31 is installed, based on, for example, the vehicle position information transmitted from the vehicle 10. As a result, when this determination result is Yes, the processing proceeds to step S102.

In step S102, the control device 26 determines whether the imaging direction Dc of the camera 31 coincides with or faces the traveling direction Dv of the vehicle 10. More specifically, the direction Dc' of the vehicle-traveling-direction component of the vector that indicates the imaging direction Dc is compared with the traveling direction Dv. The information on the imaging direction Dc used for this determination is acquired from, for example, the camera device 30 together with the intersection image. Then, the control device 26 calculates the direction Dc' from the acquired imaging direction Dc. Further, the control device 26 calculates the traveling direction Dv based on, for example, the vehicle position information.

As a result, when the imaging direction Dc (direction Dc') coincides with the traveling direction Dv (step S102; Yes), the processing proceeds to step S104. In step S104, the control device 26 displays the intersection image acquired from the intersection camera 31 at a designated cycle on the screen of the display device 23 as it is without flipping the intersection image horizontally. More specifically, in an example in which the two intersection images from the two cameras 31 are displayed on the two screens, respectively, the two intersection images are displayed as in the image display pattern PT1 shown in FIG. 3B.

On the other hand, when the imaging direction Dc (direction Dc') faces the traveling direction Dv (step S102; No), the processing proceeds to step S106. In step S106, the control device 26 determines whether or not there are two intersection images to be displayed.

When there are two intersection images in step S106, the processing proceeds to step S108. In step S108, the control device 26 displays two intersection images on the two screens, respectively, as in the image display pattern PT2 shown in FIG. 4C. To be more specific, the arrangement of the two intersection images on the screen of the display device 23 is performed so as to be laterally (or horizontally) opposite to the arrangement of the two intersection images by the processing of step S104. Further, the two intersection images are flipped horizontally with respect to the images acquired from the cameras 31.

On the other hand, when the number of intersection images to be displayed is one (step S106; No), the processing proceeds to step S110. In step S110, the control device 26 displays the intersection image on the screen while horizontally flipping the image acquired from the camera 31.

In step S112 subsequent to the processing of step S104, S108, or S110, the control device 26 determines whether or not the vehicle 10 has passed through the intersection (more specifically, the intersection subject to the determination in step S100) based on, for example, the vehicle position information.

As a result, while the vehicle 10 has not yet passed through the intersection described above, the display of the intersection images by the processing of step S104, S108, or S110 is continued. On the other hand, after the vehicle 10 has passed through the intersection, the control device 26 proceeds to step S114 and hides the intersection image corresponding to the intersection. As a result, the images displayed on the display device 23 can be minimized in accordance with the current traveling point of the vehicle 10.

That is, the remote operator can concentrate on the vehicle front images until the vehicle 10 approaches the next intersection.

As described above, according to the image process IP of the present embodiment, one or more intersection images are arranged on the screen of the display device 23 in different modes depending on the relation between one or more imaging directions Dc of one or more cameras 31 and the traveling direction Dv of the vehicle 10 (moving body). Thus, the visibility of the remote operator with respect to the image display of the display device 23 can be improved. More specifically, the remote operator can intuitively determine the position and the moving direction of the moving object existing in the intersection area with respect to the vehicle 10 based on the one or more intersection images displayed on the display device 23.

The invention claimed is:

1. A display control device for controlling image display of a display device for remote operation of a moving body, the display device including one or more screens respectively configured to display one or more intersection images captured by one or more cameras, the one or more cameras being installed at an intersection through which the moving body passes and each being configured to image a traffic situation in an area of the intersection, the display control device comprising:
a processor configured to execute an image process of arranging the one or more intersection images on the one or more screens in different modes depending on a relation between one or more imaging directions of the one or more cameras and a traveling direction of the moving body, wherein
the one or more cameras include first and second cameras,
an area of the intersection captured by the first and second cameras includes a second road that intersects, at the intersection, a first road on which the moving body travels,
when a direction of a vehicle-traveling-direction component of a vector that indicates an imaging direction of each of the first and second cameras coincides with the traveling direction, the processor is configured, in the image process, to arrange, on a left side of an image of the second camera capturing a first area of the second road located on a right side of the intersection when viewed from the moving body, an image of the first camera capturing a second area of the second road located on a left side of the intersection,
the processor is configured to compare the direction of the vehicle-traveling-direction-component of the vector that indicates the imaging direction with the traveling direction, and calculate the traveling direction based on vehicle position information,
the processor is configured to display the one or more intersection images in an image pattern on the one or more screens of the display device,
the processor is configured to display, on the one or more screens of the display device, a pedestrian that is present on a right front side of the vehicle at the intersection and is crossing the second road in a direction approaching the vehicle in accordance with the image pattern,
the processor is configured to display, on the one or more screens of the display device, a second vehicle that is present on a left front side of the vehicle at the intersection and is traveling in a direction away from the vehicle, and the processor is configured to receive vehicle information transmitted from the vehicle and present the vehicle information to a remote operator via the display device and a speaker, the vehicle information including surrounding situation information, sound detected by an in-vehicle microphone, object information related to a relative position and a relative speed of an object with respect to the vehicle, and vehicle state information including a speed, an acceleration, a yaw rate, and a steering angle of the vehicle.

2. The display control device according to claim 1, wherein
in the image process, the processor is configured to horizontally flip the one or more intersection images displayed on the one or more screens when the moving body enters the intersection from a second direction opposite to a first direction, with respect to the one or more intersection images displayed on the one or more screens when the moving body enters the intersection from the first direction.

3. The display control device according to claim 1, wherein
when the direction of the vehicle-traveling-direction component of the vector that indicates the imaging direction of each of the first and second cameras faces the traveling direction, the processor is configured, in the image process, to arrange, on the right side of the image of the second camera capturing the first area of the second road located on the left side of the intersection when viewed from the moving body, the image of the first camera capturing the second area of the second road located on the right side of the intersection, and to horizontally flip each of the images of the first and second cameras.

4. A display control system, comprising:
the display control device according to claim 1; and
the one or more cameras, wherein
the processor is configured to hide the one or more intersection images after the moving body has passed through the intersection.

* * * * *